April 7, 1931. H. H. WEAVER ET AL Re. 18,035

CUTTING AND COATING MACHINE

Original Filed April 7, 1923 3 Sheets-Sheet 1

Inventors.
Herbert H. Weaver and
Emerson A. Bolen:
By Harry C. Dennis
Atty.

April 7, 1931. H. H. WEAVER ET AL Re. 18,035

CUTTING AND COATING MACHINE

Original Filed April 7, 1923 3 Sheets-Sheet 2

Inventors.
Herbert H. Weaver and
Emerson H. Bolen.
By Harry C. Geantz
Their Atty.

April 7, 1931. H. H. WEAVER ET AL Re. 18,035

CUTTING AND COATING MACHINE

Original Filed April 7, 1923 3 Sheets-Sheet 3

Inventors.
Herbert H. Weaver and
Emerson A. Bolen.
By Harry C. Lewis
Atty.

Reissued Apr. 7, 1931

Re. 18,035

UNITED STATES PATENT OFFICE

HERBERT H. WEAVER, OF NEW YORK, N. Y., AND EMERSON A. BOLEN, OF MORRIS, ILLINOIS, ASSIGNORS TO NORTHWESTERN CORPORATION, OF MORRIS, ILLINOIS, A CORPORATION OF ILLINOIS

CUTTING AND COATING MACHINE

Original No. 1,647,594, dated November 1, 1927, Serial No. 630,456, filed April 7, 1923. Application for reissue filed January 18, 1929. Serial No. 333,398.

This invention relates to instrumentalities for converting edible substances into delicacies and more particularly to instrumentalities for processing ice cream.

It contemplates more especially the provision of a machine constituting a novel combination of elements for automatically producing ice cream coated bars of the type commercially termed "Eskimo pie," although certain features thereof may be employed with equal advantage for other purposes.

Numerous devices have heretofore been proposed for processing edible substances such as soft centers and the like with a view of enrobing the surfaces thereof with chocolate or other coatings. These are primarily adapted to receive sized or preformed centers composed of substances possessing a more or less stable character.

Congealed substances such as ice cream, ices and the like are too unstable to admit of processing for conversion into unit delicacies with devices of known construction. In fact, such substances must be sized, coated and packed for shipment or storage in a sequence of timed operations with rapidity and minimum handling.

As a consequence, the individual steps in processing substances of the character mentioned, must be executed with timed precision and speed so that the thermal effects thereon will be reduced to the minimum. In view thereof the substances must be impaled and conveyed along a predetermined path of movement, thereby requiring novel mechanical expedients coordinated in a novel and heretofore unknown manner to accomplish the desired result.

One object of the present invention is the provision of a novel combination of instrumentalities operable in timed sequence to process articles of the character mentioned.

Another object is the provision of an automatically operable device for producing edible coated articles with the utmost sanitation and without entailing much labor.

Still another object is the provision of novel, simple and inexpensive combination of instrumentalities for sizing, coating and delivering articles in a rapid sequence of operation without requiring numerous attendants and skilled supervision.

A further object is the provision of novel means for processing articles in the production of uniform coated units with speed and minimum thermal affect thereon.

A still further object is to provide novel means for coordinating the operation of feeding, coating, and delivery mechanism in timed sequence for converting edible substances into unit delicacies with the utmost sanitation, speed and uniformity.

Other objects and advantages will appear from the following description of an illustrative embodiment of the present invention:

Figure 1:
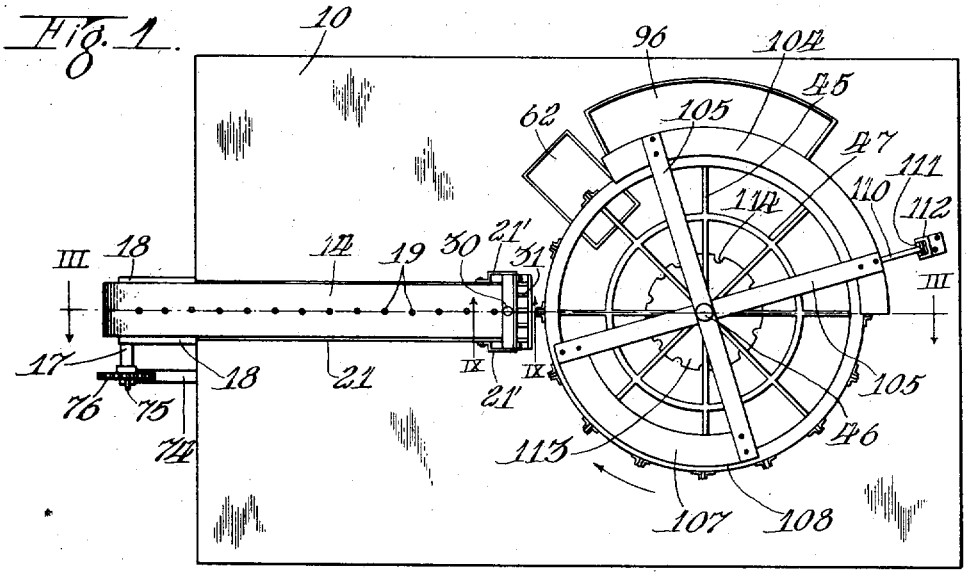
Figure 1 is a plan view of a device embodying features of the present invention.
Figure 2:
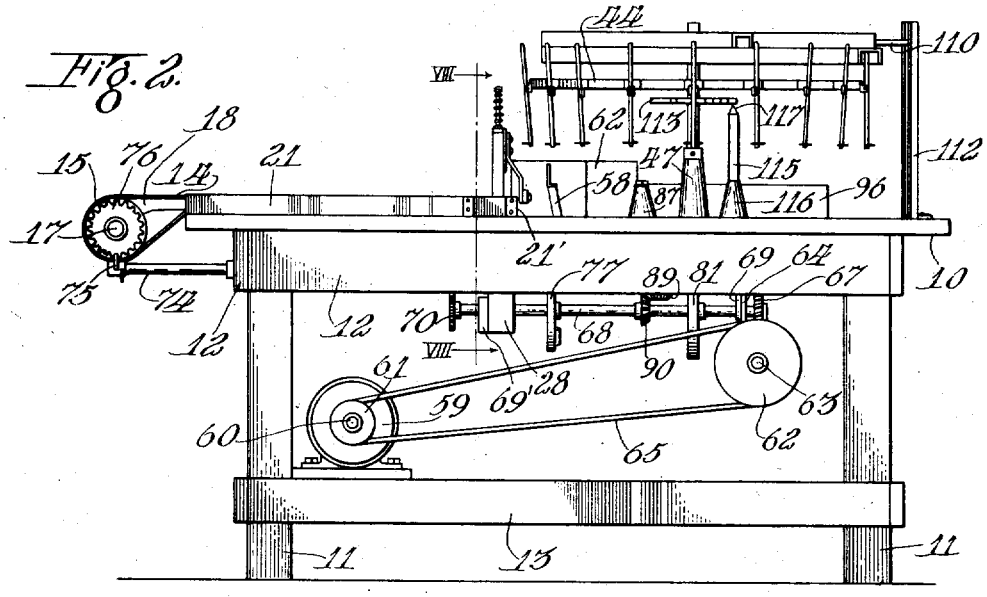
Figure 2 is a view in elevation of the device shown in Figure 1.

The structure selected for illustration comprises a frame, in this instance, a flat table top 10 supported on vertical corner standards 11. The standards 11 are braced by cross-members 12 and 13 nailed or otherwise secured thereto in any appropriate manner at spaced vertical distances to provide a rigid frame structure. In order to enable the feeding of edible substances such as slabs of ice cream along a predetermined path for processing, an endless conveyor belt 14 composed of fabric or other suitable material is supported between spaced rollers 15 and 16. It will be observed that the roller 15 is considerably larger than the roller 16, the former being carried by a shaft 17 in any suitable bearing supports 18 secured adjacent the sustaining surface of the frame top 10.

As a consequence, the substance sustaining surface of the conveyor 14 moves in parallelism with the top 10 at a distance approximating the diameter of the roller 16 having the periphery thereof in frictional engagement with the conveyor 14. The conveyor 14 is preferably though not essentially provided with apertures 19 along the longitudinal median line thereof to cooperate with correspondingly spaced pegs 20 which protrude from the periphery of the roller 15 intermediate the ends thereof to preclude any possible slip therebetween. As a consequence, rotary movement of the roller 15 will impart linear movement to the conveyor 14 at a linear velocity corresponding with the peripheral velocity of the roller 15 without any possible slip therebetween or extreme tension on the conveyor belt 14.

The belt 14 is guided in its traverse by means of an elongated channelled member 21 which corresponds in thickness with the diameter of the roller 16 for disposition between the confronting surfaces of the belt 14 on the table top 10, thereby guiding and preventing the belt 14 from sagging under the weight of the substance carried thereon. The belt sag preventing member 21 is supported at one end by brackets 21′ which serve as a bearing for the roller 16 while the other end thereof is supported by the bearing bracket 18, thereby permitting rotary movement thereof in unison with the linear traverse of the belt 14 which is in frictional contact with the periphery of the roller 15 driven intermittently as will more clearly appear hereinafter. The slabs of ice cream or other edible substances are placed on the conveyor belt 14 for movement to a cutting station for severance into uniform segments or units of any predetermined size.

The sizing or cutting device consists, in this instance, of spaced vertical knife supporting members 22 which project through slots 23 provided in the table top 10 near the discharge end of the conveyor 14. The members 22 are held in spaced fixed relation by a cross member 24 fixed to the upper extremities thereof by any suitable fasteners such as the screws 25. Another cross-member 26 bridges the spaced vertical knife carrying members 22 below the table top 10. Reciprocal, intermittent, vertical movement is imparted thereto for guidance in grooves 27 which are formed in guide members 28 depending from the table top 10 in confronting relation to receive the knife carriers 22 therebetween. The guides 28 are disposed beneath a cutting block 30 which is positioned on the table 10 adjacent to the discharge end of the conveyor 14 moving intermittently in a counter clockwise direction (viewed from Figure 3). The block 30 is preferably though not essentially provided with transversely spaced notches 31 having inclined bottoms communicating with an edge 32 thereof to prevent the accumulation of waste material occasioned by the cutting or severing operation.

It is to be noted that the spaced standards 22 have a severing blade or knife instrumentality 33 fixed thereto in any suitable manner so that the tapered or cutting edge 34 thereof will be in confronting relation with the cutting block 30 along a line where the notches 31 merge with the sustaining surface of the cutting block 30. The notches 31 receive whatever waste material which may result responsive to the descent of the standards 22 carrying the severing instrumentality or blade 33 therewith in the direction of the cutting block 30 which receives the substance slab from the conveyor belt 14. It is to be noted that the knife 33 descends during the rest period of the conveyor 14 which moves intermittently while the knife is in its elevated position. In order to prevent the substance from being carried upwardly with the ascent of the knife 33, a retaining member of novel construction is provided in association therewith.

The retaining member consists, in this instance, of a readily flexible bowed strap 34 conforming in width with the standard 22 for support by a rod 35 secured intermediate the ends thereof for sliding projection through the cross member 24. The rod 35 terminates in a head 36 which serves as a stop for a retractile spiral spring 37 enveloping the rod 35 above the cross member 34. The spring 37 has its extremity 38 secured to the rod 35 near the head 36 while the other extremity 39 thereof is secured to the cross member 24 to resiliently suspend and urge downwardly the bowed retaining member or flexible strap 34. The extremities of the strap 34 first contact with the slab of ice cream or other substance supported on the block 30 while the knife 33 descends. With the descent of the knife 33, the bowed strap 34 gradually loses its curvature to contact with the surface of the substance, thereby holding such against movement during the descent of the knife 33 entirely through the substance to sever a unit therefrom. With the ascent of the knife 33, the retaining member 34 gradually assumes its bowed shape in order to prevent the substance from adhering thereto or the knife 33 in ascent thereof.

To insure the severing of the substance into uniform segments or units, a measuring device is associated with the severing instrumentality. The measuring device consists, in this instance, of a transverse stop member 40 riveted or otherwise fastened to spaced brackets 41 having articulated portions 42 secured to each of the standards 22, thereby supporting the stop member 40 a predetermined distance from the knife 33. This distance constitutes the width of the bar or unit to which the substance is sized prior to being coated in a manner to be more fully described hereinafter. It will be apparent that the stop member 40 is positioned in the path of the substance conveyed to cutting block 30 by the conveyor 14 during the advance thereof, thereby stopping the movement thereof at a predetermined position just prior to or simultaneous with the stopping of the belt 14 which moves intermittently. The descent of the knife 33 will sever the substance into a segment of predetermined size while the stop member 40 descends through a slot 43 provided in the table top 10 to permit the knife 33 to make a full descent in contact with the cutting block 30.

After the ascent of the knife 33, the segment or unit constituting the core of the finished article is carried to a coating fluid by means of instrumentalities operating intermittently in timed sequence with the severing device. The coating is effected through the medium of any suitable core transferring device, in this instance constituting impaling means carried by a rack which comprises a circumferential band 44. The band 44 is supported by means of radially disposed spokes 45 terminating in a hub secured to a vertical shaft 46. The spokes 45 are preferably braced by means of an intermediate ring 47 to reinforce the structure. The shaft 46 is journalled in a bearing 47 constituting a part of a plate 48 secured to the under side of the table 10, the bearing 47 projecting above the top surface thereof through a suitable aperture 49 formed therein, thereby providing sufficient lateral support for the shaft 46 and its accessories.

As shown, the band 44 is provided with a plurality of circumferentially spaced brackets 50, in this instance sixteen, pivotally carried by screws 51 projecting therethrough and serving as supports therefor. The brackets 50 are each provided with spaced lugs 53 which receive pins 54 therethrough to pivotally carry vertically extending article holder rods 55, the pins 54 preferably being of the cotter-pin type to enable the ready association and disassociation of the rods 55 therewith. The article holder rods 55 extend downwardly to receive any suitable impaling devices thereon which, in this instance, consist of a wire 56 terminating in spaced right angular prongs 57. The prongs 57 extend outwardly to impale the cores for conveyance to the coating station responsive to the intermittent arrival of successive impaling devices 56 adjacent the cutting block 30 or cutting station subsequent to each timed intermittent advance of the conveying belt 14.

To this end, a kicker-bar 58 projects through an opening 59 in the table 10 rearwardly of the cutting block 30 for pivotal connection to a lug 60 carried by the plate 48 by means of a pin 61. The kicker-bar 58 is caused to pivot in a clockwise direction (viewed from Figure 3) subsequent to the descent of the knife 33 and the rack 44 with an impaling device 56 disposed adjacent a severed core so as to effect the impalement thereof for conveyance to the coating station. The coating station comprises a tank 62 positioned on the table for confining any suitable coating liquid such as chocolate therein. It will be apparent that the coating tank 62 is so positioned relative to the rack 44 so that an impaling device 56 carrying a core will be immersed therein while another impaling device stops at the cutting station to simultaneously dip a core and then impale another. The dipping or coating is effected responsive to the descent of the rack 44 carried by the shaft 46 in a manner that will be more fully described hereinafter.

The descent of the rack 44 is only momentary and only of sufficient duration to impale a core and quickly immerse another in the coating fluid for only a brief time in order to prevent any substantial thermal change of the processed substance which, in the instance of ice cream, is of a very unstable nature. Subsequent to dipping, the rack 44 ascends and then turns to carry the cores after immersion for a space of time to enable or promote the congelation of the coating substance thereon. At this time, the coated cores may be removed from the impaling prongs 56 by hand, mechanical device or wrapping mechanism. It is necessary or at least highly desirable to apply a wrapper to articles of this character for sanitation purposes and to improve the keeping qualities thereof, although this may be accomplished by manual or automatic mechanism as commercial practice may dictate.

The rack 44 is provided with a plurality of holder rods 55, each having impaling prongs 56, in this instance sixteen, which are successively moved or rotated to the cutting station at intermittent intervals in timed sequence with the intermittent linear movemen or advances of the conveyor belt 14. The belt 14 carries the substance to the cutting block 30 for effecting the severance thereof into predetermined units or cores at intervals corresponding with the movement of the impaling devices or core holders 56. These instrumentalities are actuated in timed sequence by means of any suitable power source such as an electrical motor 59 supported by the cross-member 13 so that the armature shaft 60 thereof will carry a pulley 61 in alignment with a pulley 62 on a transverse shaft 63. The shaft 63 is supported in a bearing bracket 64 depending from the bed plate 48 disposed beneath the table top 10 for attachment to the underside thereof in any appropriate manner.

A belt 65 is in frictional contact with the pulleys 61 and 62 to impart continuous rotary movement to the latter having the shaft 63 thereof carrying a worm 66 which meshes with a worm wheel 67 carried by a shaft 68. The shaft 68 is disposed transversely of the shaft 63 for support in brackets 69 and 69[1], the former being integrally or otherwise associated with the plate 48 for depending support therefrom. The bearing bracket 69[1] bridges the depending cutter frame guides 28 beneath the table 10 to maintain them in rigid spaced relation and also to support the shaft 68. The shaft 68 has the extremity thereof provided with a spur gear 70 which is fixed thereto to mesh with a spur gear 71 carried by an auxiliary shaft 72 journalled in brackets 73 which are secured to the table top 10. The brackets 73 depend from the table top 10 near the forward end of the table to support the shaft 72 having an extension 74 thereof projecting beyond the end of the table 10 to carry an interrupted or deformed worm 75 proximate to the extremity thereof.

The worm 75 meshes with a worm wheel 76 fixed to the shaft 17 which carries the driving roller 15 in frictional contact with the conveyor belt 14, thereby intermittently moving the belt 14 towards the cutting station to feed the substance thereto in timed sequence with the cutting instrumentalities. The intermittent movement of the belt 14 is effected by providing the worm 75 with a deformed convolution which advances the belt 14 a predetermined distance necessary to properly size the substance into core widths responsive to the rotation of the shaft extremity 74. The belt 14 then rests to permit the operation of the knife 33 during the interval of rotation of the worm 75 along that portion 75′ of the convolution which is straight or normal to its longitudinal axis rather than curved to define a helix constituting the driving portion of the worm 75. This helical portion of the worm 75 is in continuity with the straight portion 75′ which determines the period of rest of the belt 14 while the remainder of the convolution effects the traverse thereof.

To operate the severing instrumentality, in this instance the knife 33 in timed sequence with the conveyor belt 14, so that the descent thereof will be effected during the rest period of the belt 14, a cam 77 is mounted on the shaft 68 to provide a camming edge 78. A cam follower or actuator 79 is fixed to the cross member 26 of the spaced knife carrying standards 22 to effect the ascent and descent thereof controlled by the cam follower 79 which coacts with the edge 78 of the cam 77. As a consequence, the knife 33 will descend while the belt 14 is maintained stationary, and the full ascent thereof effected just prior to again initiating the movement of the conveyor belt 14 toward the cutting block 30.

With the ascent of the knife 33, the rack 44 which is supported by the shaft 46 descends in that the lower extremity thereof is provided with an axially disposed relatively rotatable pintle 80 carrying a roller 80′ journalled therein to serve as a cam follower coacting with the periphery of a cam 81. A rod 80″ extends from the cam follower pintle 80 for projection into the channel of the bracket 69, thereby preventing rotation of the pintle 80. The cam 81 is fixed to the shaft 68 for rotation in unison therewith to elevate and effect the descent of the rack 44 substantially in timed relation with the corresponding vertical movement of the knife 33. Subsequent to impalement of the core 82 followed by the full ascent of the knife 33 and the rack 44, the latter is again rotated a predetermined extent while the belt 14 advances so that the successive picker or core holder rod 55 will be in alignment with the cutting block 30 to bring its impaler prong or fingers 57 adjacent to the face of the core 82 with the successive descent of the rack 44. The full descent of the rack 44 with its article holders 55 brings this particular impaling prong 56 in confronting relation with the core 82 constituting the unit just severed from the substance carried forward by the conveyor belt 14.

The shaft 46 is provided with a gear 84 having a plurality of uniformly spaced teeth corresponding in number with the core or article holders 55 uniformly spaced around the circumference of the rack band 44. The gear 84 meshes with a pinion 85 carried by a stud shaft 86 journalled in a boss 87 constituting an integral portion of the plate 48. As shown, the shaft 86 projects downwardly to carry the pinion 85 in alignment with the gear 84 just beneath the plate 48. The pinion 85 has a single tooth 88 formed thereon to rotate the gear 84 the distance of one tooth responsive to every revolution of the shaft 86 which is operatively geared to the shaft 68 by means of meshing bevel gears 89 and 90 fixed to the shafts 86 and 68, respectively, to impart rotation thereto. It is to be noted that each revolution of the shaft 68 will intermittently move the rack 44 the distance of one article holder 55 or impaler prong 56 just prior to every descent thereof adjacent the core 82 severed from the slab by the complete descent of the knife 33 after each advance of the conveyor belt 14.

Figures 3, 14:
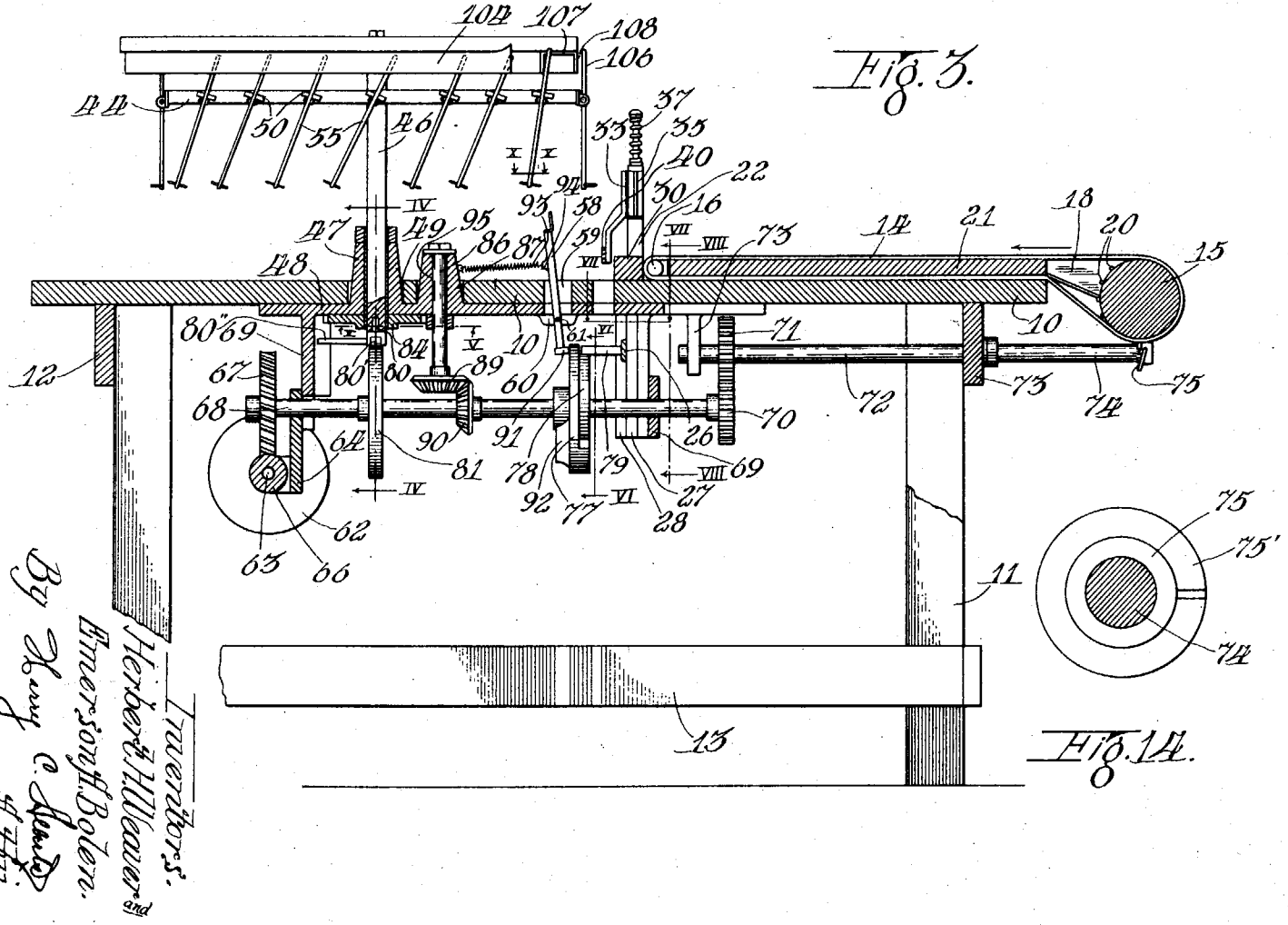
Figure 3 is a sectional view taken substantially along line III—III of Figure 1.
Figure 14 is an enlarged sectional view of a worm employed to effect the intermittent operation of the conveying mechanism.
Figure 5:
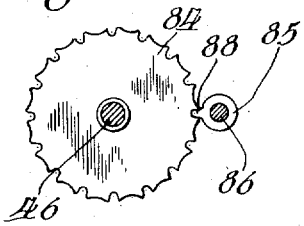
Figure 5 is a view taken substantially along line V—V of Figure 3.
Figure 10:
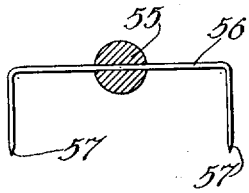
Figure 10 is a sectional view taken substantially along line X—X of Figure 3 showing an impaling device.
Figure 4:
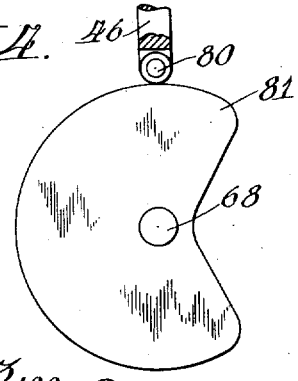
Figure 4 is a view of a cam mechanism taken substantially along line IV—IV of Figure 3.
Figure 6:
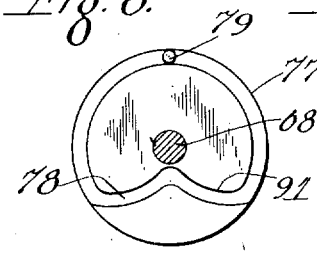
Figure 6 is a sectional view in elevation of a cam mechanism taken substantially along line VI—VI of Figure 3.
Figure 7:
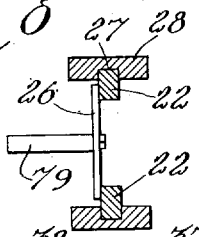
Figure 7 is a sectional view taken substantially along line VII—VII of Figure 3.
Figure 11:
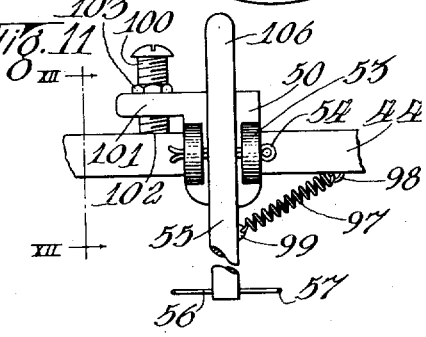
Figure 11 is an enlarged fragmentary view in elevation showing an individual article holder rod or impaling device carrier.

The prong 56 is caused to impale the core 82 or become embedded therein at this moment in that the kicker bar 58 is pivoted in a clockwise direction (viewed from Figure 3). This is effected by means of a roller cam follower 91 which is secured to the extremity of the kicker bar 58 to cooperate with the camming surface 92 formed on the face of the cam 72 opposite to the camming surface 78. The cam follower 91 is normally kept in contacting relation with the camming surface 92 by virtue of a spring 93 having one extremity thereof secured to the lug 94 carried by the kicker bar 58 while the other extremity thereof is anchored to a lug 95 formed on the boss 87, thereby maintaining the cam follower 91 in contact with the camming surface 92.

With the arrangement of parts thus far described it will be apparent that the conveyor belt 14 intermittently carries the substance, in this instance slabs of ice cream, to the cutting station 30 in contact with the stop 40 fixed to the cutting frame 22. At this time, the belt 14 momentarily stops its advance to permit the severing mechanism including the knife 33 to descend for travel through the substance on the block 30, thereby successively sizing the substance into rectangular cores 82 at intermittent intervals. While the knife 33 is in its elevated position, an article holder 55 with its impaling device 56 is brought in alignment with the core 82 by the partial rotation of the rack 44. The rack 44 with its article holders 55 then descends to enable the impaling device 56 at the cutting station to become embedded in the core 82 owing to the clockwise movement (viewed from Figure 3) of the kicker bar 58 during the time the knife 33 is momentarily held in its lowermost position. The rack 44 then ascends with the impaled core 82 and rotates until the succeeding article holder 55 arrives at the cutting station 30 for another descent substantially simultaneous with the operation of the knife 33. The belt 14 moves the substance in contact with the stop 40 just prior to the descent of the knife 33. Thereupon the rack 44 again descends to bring the succeeding impaling device 56 in alignment with the succeeding core 82 while the preceding core simultaneously descends for immersion in the coating confined in the tank 62. With the ascent of the rack 44, further rotation thereof intermittently effected to carry the coated bars for a space of time allowing the congelation of the coating thereon until reaching the discharge station where they are removed either by manual or mechanical means as commercial practice may dictate for the purpose of applying a wrapper thereto.

Figure 9:
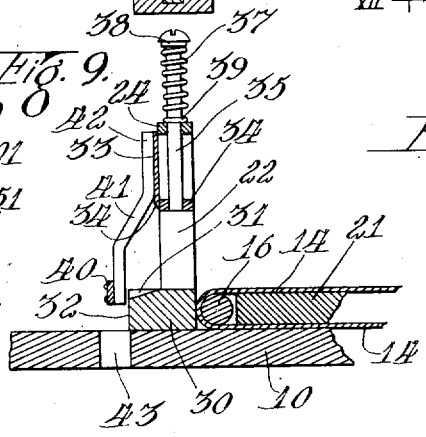
Figure 9 is a sectional view taken substantially along line IX—IX of Figure 1 showing the coating mechanism.
Figure 8:
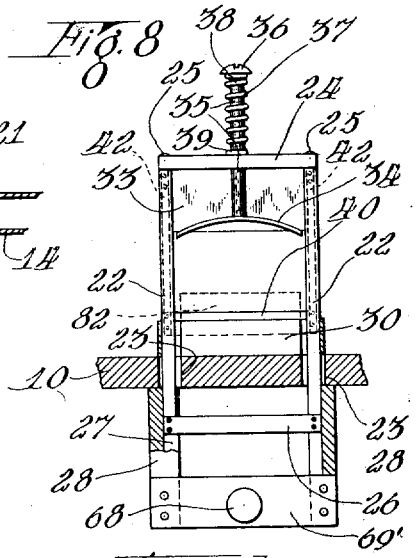
Figure 8 is a sectional view taken substantially along line XI—XI of Figures 2 and 3.
Figure 13:
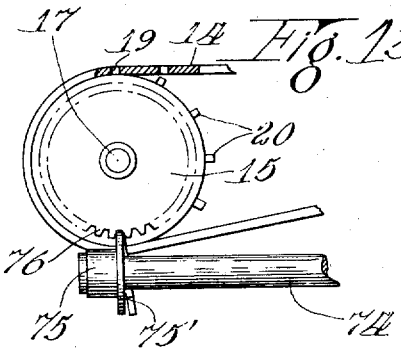
Figure 13 is a fragmentary view in elevation of the conveyor belt feeding mechanism.

To facilitate the dripping of the coating from the core prior to congelation incident to the movement thereof over a drip pan 96, the article holders 55 are inclined or tilted in the direction of its movement. For this purpose, their supporting brackets 50 are pivotally mounted on the screw pins 51 in a manner more fully described hereinabove. The article holders 55 are normally held in a vertical position by means of a coil spring 97. The spring 97 has one extremity thereof secured to the band 44 as at 98 while the other extremity is anchored to a lug 99 integrally or otherwise associated with the article holders 55, thereby positioning the article holders bars 55 in their extreme counterclockwise or vertical position (viewed from Figure 9). This extreme position is controlled by a set screw 100 which is in threaded engagement with an arm 101 formed integrally with the bracket 50 to extend in parallel spaced relation with the band 44. As a consequence, the set screw extremity 102 will contact with the band 44 to enable adjustment relative to the vertical position. A lock nut 103 is positioned adjacent the arm 101 in threaded engagement with the shank of the set screw 100 to prevent accidental movement thereof.

In view thereof the article holder bars 55 are capable of swinging movement in a clockwise direction (viewed from Figure 9) owing to the provision of a cam quadrant 104 which is supported by radial members 105. These are journalled at their intersecting axes to the upper extremity of the shaft 46, thereby disposing the quadrant in the path of the article holder bar extensions 106 to tilt the holder bars 55 carrying the coated cores or articles during their movement from the coating tank 62 to the discharge station over the drip pan. The excess coating is effectively drained from the article prior to the congelation thereof, this being highly desirable to conserve the coating as well as to result in a uniform casing for the confection.

Figure 12:
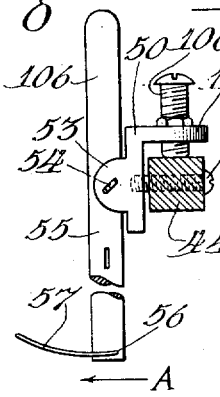
Figure 12 is a sectional view taken substantially along line XII—XII of Figure 11.

Another quadrant 107 is fixed to the radial supports 105 at the other extremities thereof for disposition opposite to the camming quadrant 104. The quadrant 107 is positioned at a radius so that the exterior rim 108 thereof will be in confronting relation with the article holder bar extensions 106 to prevent the outward pivotal movement (see arrow A—Figure 12) of the impaling prongs 56 at the discharge station. As a consequence the attendant can manually remove the coated articles without any consequent displacement of the article holder bars which occurs during the impalement of the cores subsequent to the sizing thereof. Rotary displacement of the quadrants 104 and 107 is prevented by a rod 110 which projects from their frame support 105 to carry a follower 111 which rides in a correspondingly shaped vertical guide 112 secured to the table top 10. The guide 112 permits the ascent and descent thereof in unison with the shaft 46, thereby insuring against rotary displacement which would interfere with the desired timed tilting of the holders 55 as well as the engagement thereof with the quadrant 107 to preclude outward pivotal movement thereof.

Exact registration between the impaling prongs 56 and the successively sized cores 82 is effected by means of an indexing mechanism 113. The indexing mechanism constitutes in this instance, a disc fixed to the shaft 46, it being provided with semi-circular notches 114 on the periphery thereof in radial alignment with the article holders 55. The notches 114 register with a rod 115 fixed to the table top 10 through the medium of a base support 116. The pointed extremity 117 thereof will register and project through the notches 114 incident to the descent of the rack 44 with the shaft 46, thereby precluding any rotary movement of the rack 44 while the cores 82 are impaled and immersion thereof successively effected.

Various changes may be made in the embodiment of the invention herein specifically described without departing from or sacrificing any of the advantages thereof as defined in the appended claims.

We claim:

1. In a coating machine, means for feeding confection centers, a rotatable rack having a plurality of confection holding hooks, means for lowering and raising said rack, an actuating member for imbedding said hooks in the confection centers, and a coating material tank adapted to receive said centers one at a time as said rack is lowered.

2. A machine for coating ice cream comprising means for slicing bars of ice cream from bricks thereof, a rotatable rack having a plurality of spaced hook members, means for raising and lowering said rack, a kicker bar impinging said hook members for impaling said bars of ice cream thereupon, a tank for coating material adapted to receive the impaled bars of ice cream one at a time, and means for intermittently rotating said rack a fraction of a revolution.

3. A machine for coating ice cream comprising a rack provided with a plurality of hook members, means for imparting alternately rotative and reciprocal movements to said rack, mechanism for producing bars of ice cream co-jointly with the reciprocal movement of said rack, a kicker bar for successively impinging said hook members in the lowermost position thereof, a tank adapted to immerse in rotation the material suspended upon said hooks, and guide members for said hooks adapted to tilt the coated material suspended thereon to facilitate drainage of uncongealed coating material therefrom.

4. A confection coating machine comprising a rotating rack, hooked members suspended therefrom, guide means adapted to tilt said hooks to different angles during the rotation of said rack, a frame mounting said guide means upon said rack for movement relative thereto, means for preventing rotative movement of said frame, and a tank for coating material in juxtaposition to said rack.

5. In an ice cream coating machine, a tank for coating material, a rack provided with hook members, and a pusher bar impinging said hook members, said rack and pusher bar being actuated by a single driving member, said hooks being immersed in said tank one at a time responsive to said driving member.

6. An ice cream coating and dipping machine comprising a frame, a prime mover, a driven shaft upon said frame, a rack slidably and rotatably mounted upon said frame, means for intermittently raising and lowering said rack, a gear and pinion intermediate said rack, and said shaft for imparting a fractional revolution thereto in a raised position thereof, a conveyor for ice cream, a reciprocating knife adapted to slice ice cream upon said conveyor, hook members upon said rack to impinge the slices of ice cream, a kicker bar for advancing said hook members toward and into said slices of ice cream, a tank for coating material to receive slices of ice cream carried by said hooks, a guide member for tilting said hooks, and a second guide member for swinging said hooks outwardly from said rack.

7. An ice cream cutting and dipping machine as described in claim 6, including means on said shaft for rotating said rack.

8. An ice cream cutting and dipping machine as described in claim 6, including means for co-jointly raising and lowering said knife and rack.

9. An ice cream cutting and dipping machine as described in claim 6, including means to reciprocate said guide members with said rack.

10. An ice cream cutting and dipping machine as described in claim 6, including a frame support and an auxiliary guide member on said first named guide member to prevent the rotation thereof with said rack.

11. An ice cream cutting and dipping machine as described in claim 6, including a single cam member for actuating said kicker bar and said knife.

12. An ice cream cutting and dipping machine as described in claim 6, including means for rotating said rack and concurrently advancing said ice cream conveyor.

13. An ice cream cutting and dipping machine as described in claim 6, including means for twice reciprocating each bar of ice cream upwardly and downwardly before immersion in said tank.

14. An ice cream cutting and dipping machine as described in claim 6, including cooperating guide members for equalizing each fractional rotational movement of said rack.

15. An ice cream cutting and dipping machine as described in claim 6, a perforated plate on said rack, and a stationary member on said frame for engaging said perforated plate during the reciprocal movement of said rack for intermittent movement correction.

16. In a dipping machine, a tank, a rack, a tank for coating material, and dipping hooks swingably secured to said rack for immersion in said tank one at a time, and means for tilting said hooks at right angles to the direction of their swinging movement.

17. A dipping machine comprising a tank for coating material, a moving rack, a hook member, and an intermediate member for mounting said hook member on said rack and means for modifying the angular position of said hook member with respect to said rack.

18. A dipping machine comprising a tank for coating material, a rack, a holding member comprising a rod and prongs and adapted to be immersed in said tank, a carrier for said holding member to effect the attachment thereof in swingable position to said rack, said carrier member having an extension portion, and adjusting means cooperating with said extension portion in engagement with said rack to modify the angular relation of said holding member and said rack.

HERBERT H. WEAVER.
EMERSON A. BOLEN.